United States Patent
Jehly

[11] 3,916,185
[45] Oct. 28, 1975

[54] CIRCUITRY FOR ENCODING ALTIMETER

[75] Inventor: Lynn Charles Jehly, Davenport, Iowa

[73] Assignee: The Bendix Corporation, South Bend, Ind.

[22] Filed: Mar. 1, 1974

[21] Appl. No.: 447,460

[52] U.S. Cl............. 250/231 SE; 250/555; 250/209; 356/4; 73/386
[51] Int. Cl.[2] .......................................... G01G 3/08
[58] Field of Search....... 250/231 P, 231 R, 231 SE, 250/570, 555, 209; 356/27, 28, 4; 73/386, 387, 384; 33/227

[56] References Cited
UNITED STATES PATENTS

| | | | |
|---|---|---|---|
| 3,513,708 | 5/1970 | Springer | 73/384 |
| 3,573,471 | 4/1971 | Kolb | 250/570 X |
| 3,725,665 | 4/1973 | Talmo | 250/231 SE X |
| 3,750,473 | 8/1973 | Bennett et al. | 73/387 |

*Primary Examiner*—Walter Stolwein
*Attorney, Agent, or Firm*—Leo H. McCormick, Jr.; William N. Antonis

[57] ABSTRACT

In an altimeter having a commutator disc attached to the output shaft of the aneroid, an encoder for supplying a digital analyzer with an operational signal upon a change in altitude. Opaque and translucent segments are concentrically located at various radii on the commutator disc. A series of light emitting diodes are located at the various radii to present illumination to the opaque and translucent segments. A corresponding series of photosensitive transistors are located in line with the light emitting diodes. Each of the photosensitive transistors upon receiving illumination from the light emitting diodes will produce an electrical current signal. The electrical current signal from each photosensitive transistor is carried to the base of a switching transistor where a voltage level translation is carried out to produce a series of operational signals representative of a code on the commutator disc associated with a particular altitude which are compatible with the digital analyzer. The operational signals are transmitted to the digital analyzer for retention in a memory of an aircraft air traffic control transponder until said transponder is interrogated, at which time said operational signals are recorded and transmitted to the air traffic control ground station.

When the aircraft altitude is changing, each new altitude increment to the transponder destroys the previous altitude input such that only the most recent data is stored in the transponder memory. An inhibitor, connected to the power supply of the photosensitive transistors and the digital analyzer, in response to a command signal will interrupt the creation of the operational signal and allow information, other than altitude, to be retrieved from the memory without interference.

15 Claims, 3 Drawing Figures

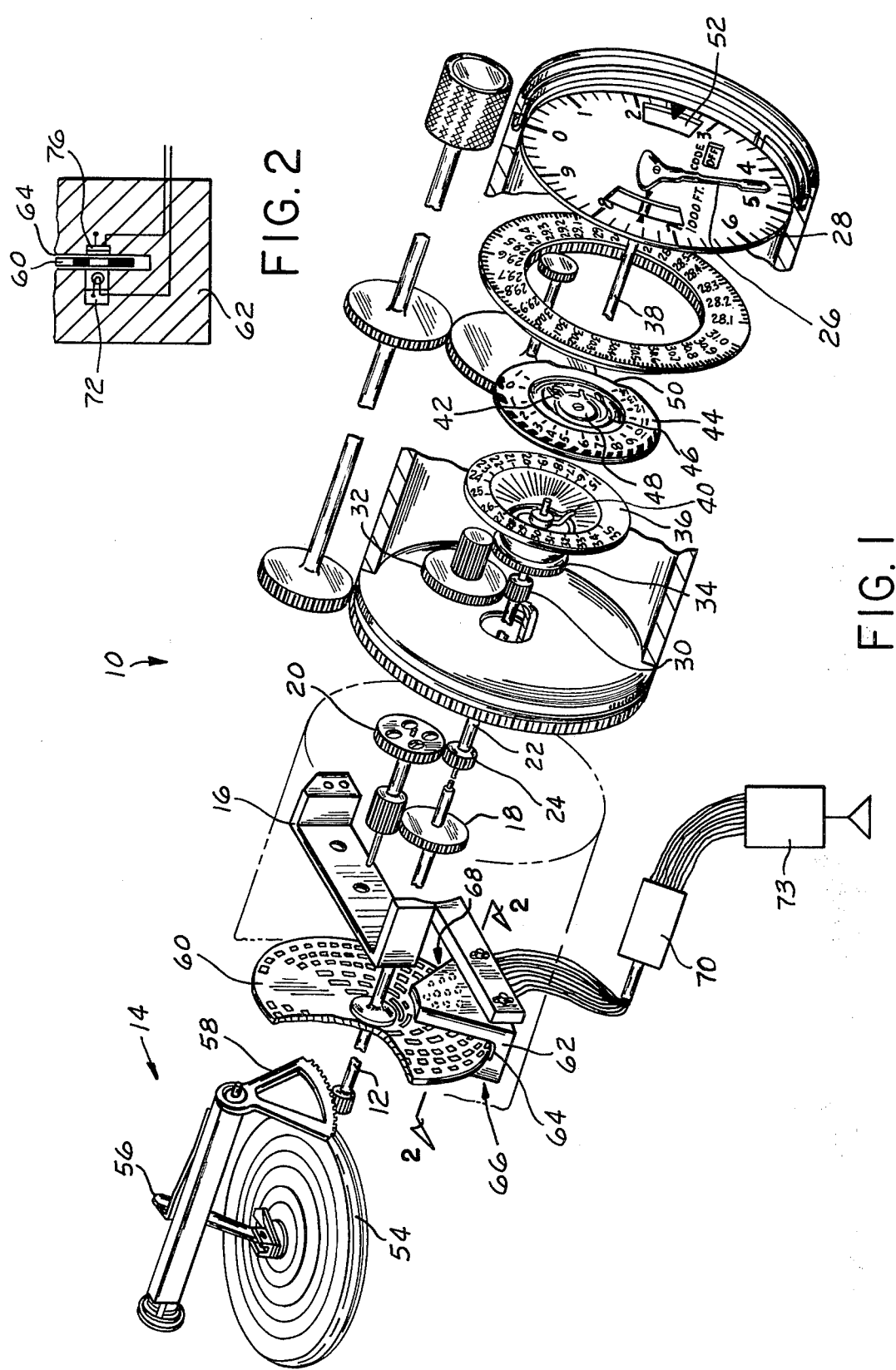

CIRCUITRY FOR ENCODING ALTIMETER

BACKGROUND OF THE INVENTION

An altimeter will provide an aircraft pilot with in flight information with respect to altitude. In the past, when the pilot came to an airport and desired to land, a direct voice communication link between the aircraft and the ground station air traffic controller was necessary to identify the aircraft and the flight elevation in order to be systematically added to a landing pattern. However, with an ever increasing number of aircraft requesting to land at large airports, the Federal Aeronautics Administration has set forth specific regulations requiring aircraft to have automatic encoding and transmitting apparatus for supplying such in flight data.

An early known encoder, had a commutator disc with electrical terminal strips of varying lengths located thereon representing various altitudes. This commutator disc was located on the output shaft of the aneroid which carries altitude information to a visual readout. A plurality of readout brushes, fixed to a support adjacent the encoder disc, engage the terminal strips thereon and supply a transponder with digital data which can be transmitted to an air traffic controller in response to an interrogation signal. However, some climatic and rapid temperature changes have adversely affected the accuracy of the digital data produced.

Later an encoder was developed having a commutator disc with opaque and translucent portions thereon to form a digital code. A single light source placed on one side of the commutator disc supplied a series of photocells with illumination to create digital data from output therefrom. However, the photo cells did not completely shut off so that an output signal was not completely accurate and their "turn on" characteristics were sensitive to output loading.

SUMMARY OF THE INVENTION

I have invented an optical encoding system for an altimeter wherein a code is derived by illuminating a commutator disc having opaque and translucent segments thereon with a plurality of light emitting diodes to actuate a plurality of photosensitive transistors. The output of the photosensitive transistors is translated by a corresponding series of switching transistors to voltage levels compatible with general aviation transponders. Each of the plurality of photosensitive transistors upon receiving illumination will permit electrical energy from a source, to flow into the base of the corresponding switching transistor. With electrical energy present at the base, it forces the switching transistor into a saturated condition.

When the switching transistor is in the saturated conduction condition, the collector to emitter voltage drop is very low (less than 0.1 volts). This voltage drop represents a closed circuit state voltage which is presented to the air traffic control transponders. This voltage drop is sufficiently low to act as a compatible interface between general aviation air traffic control transponders and optical altitude digitizers. When the photosensitive transistor connected to the base of the switching transistor is in the non-conducting condition, it forces the switching transducer into a non-conducting condition which presents the appropriate open circuit state to the air traffic control transponder. A resistor located between each of the photosensitive transistors and a common lead from each of the switching transistors acts as a bleeder resistor to ensure the switching stays in the non-conducting state at the proper times even though some electric current leakage may be present from the photosensitive transistor.

To insure that no interference is present during the interrogation of the transponder by the air traffic control, for modes of operation other than those used for altitude reporting, an inhibiting means located between the source of operational energy for the light emitting diodes and the photosensitive transistors and the common lead to the digital analyzer will momentarily interrupt the transmission of digital data to permit the air traffic controller to obtain a positive signal without interference in response to an interrogation of the transponder for information replies other than altitude.

It is therefore an object of this invention to provide an encoding altimeter with switching means for supplying a digital analyzer with compatible data corresponding to aircraft altitude.

It is another object of this invention to provide an optical encoder with an inhibiting means for preventing data from being transmitted to a transponder during periods of interrogation by an air traffic controller when data other than altitude is desired.

It is a further object of this invention to provide an altimeter with an optical encoder for converting opaque and translucent segments on a disc into a code representing altitude when a series of photosensitive transistors receive illumination from a corresponding series of light emitting diodes.

These and other objects will become apparent from reading this specification and viewing the drawing.

BRIEF DESCRIPTION OF THE DRAWINGS

FIG. 1 is an exploded perspective view of an encoding altimeter for providing a digital analyzer with data to supply a transponder with information as to the instantaneous altitude of an aircraft for transmission to an air traffic controller.

FIG. 2 is a sectional view along line 2—2 of FIG. 1 showing the relationship of a light emitting diode and photosensitive transistor with respect to code carrying disc indicative of altitude.

DETAILED DESCRIPTION OF THE PREFERRED EMBODIMENT

Figure 3:
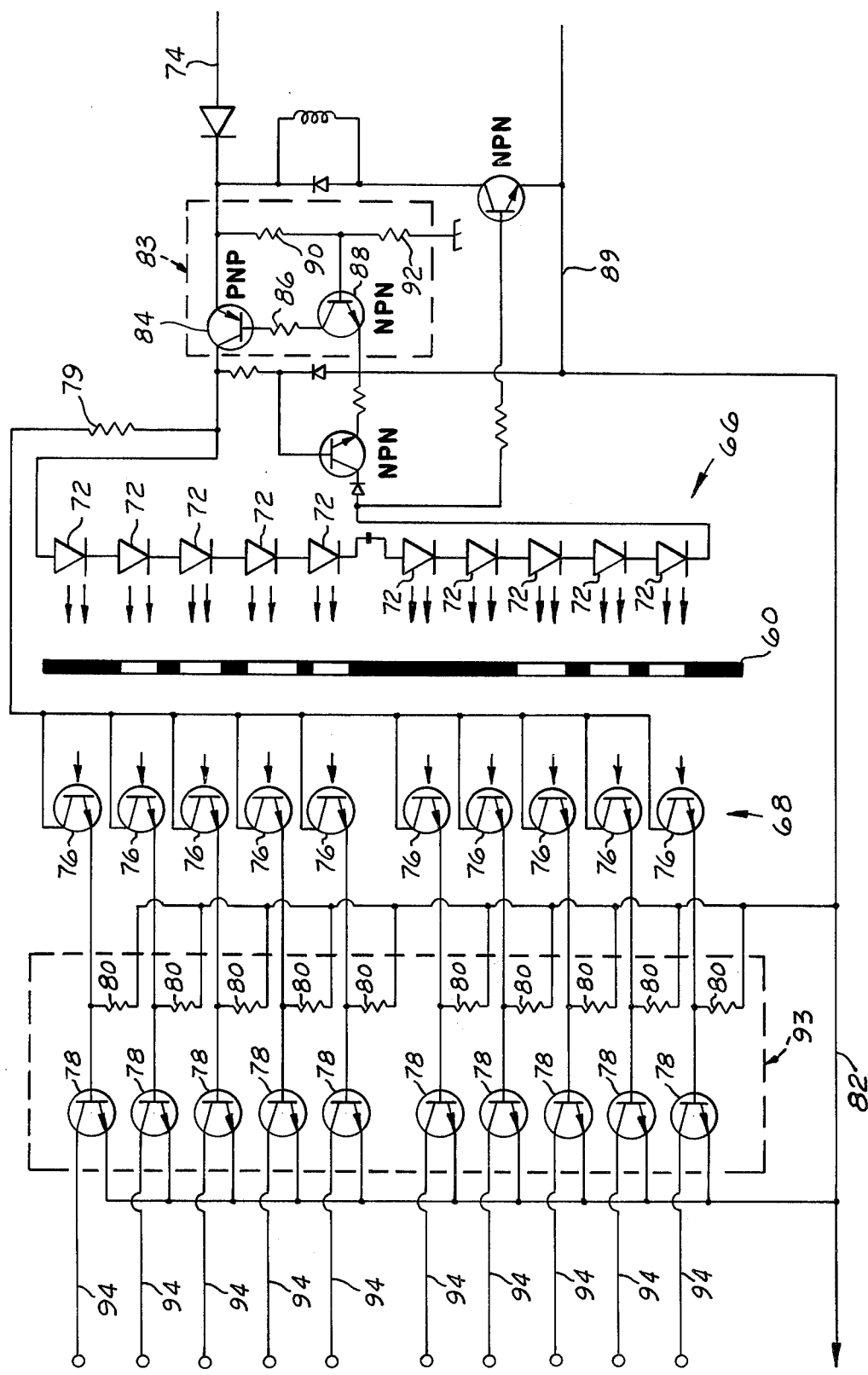
FIG. 3 is a schematic illustration of the electrical circuitry for operating the light emitting diodes and photosensitive transistors in the altimeter of FIG. 1.

In the altimeter 10 shown in FIG. 1, the output shaft 12 from the aneroid means 14 is carried through a bearing wall 16 to a driver gear 18. Drive gear 18 is connected through differential train 20 to gear 24 on indicator shaft 22. The indicator shaft 22 has a pointer 26 attached to the end thereof which will overlie dial 28 on which primary indicia representing changes in altitude up to 1,000 feet are proportionally spaced. A second drive gear 30 on shaft 22 is connected to ratio gear 32 for providing a rotary input to gear 34 attached to dial 36. Gear 34 is free to rotate on a sleeve 38 which surrounds shaft 22. A stop 40 on dial 36 engages arm 42 to correspondingly rotate dial 44 in opposition to spring 46. Spring 46 is attached to a stationary stop 48 which inhibits the dial 44 to permit secondary indicia on dial 36 to be presented through slot 50 to window 52.

The aneroid means 14 includes the evacuated capsule 54 to which bimetal lever arm 56 is attached to move sector gear 58.

A commutator disc 60 is rigidly attached and aligned to output shaft 12 in a manner such that the opaque and translucent segments thereon can produce a code which corresponds to the information presented in dial 28 and window 52. A housing 62 having a slot 64 into which disc 60 is located retains a light means 66 adjacent one side of disc 60 to present illumination through a translucent segment to a sensor means 68. The sensor means 68 converts the illumination presented through the translucent segments of disc 60 into an electrical signal to the voltage level translator 93 from which digital information as to altitude can be transmitted to digital analyzer 70 and stored in transponder 73 and retrieved when an interrogation signal is communicated from an air traffic controller to a transponder 73 in an aircraft.

The light means 66 consists of 10 light emitting diodes 72 each of which is located in housing 62, one of which is shown in FIG. 2, on a different radius from the center of shaft 22 so as to present illumination only on a selected arc. As shown in FIG. 3, all the light emitting diodes are connected in series so that illumination is continually presented to the accumulator disc 60 when D.C. current is supplied from a source on lead 74. As can be seen in FIG. 3, the opaque sections of the commutator disc 60 prevent illumination from reaching the sensor means 68 so as to sequentially establish a code from which a digital signal can be produced during rotation of shaft 22 by the expansive and contractive force of the capsule 54 acting to move segment gear 58.

The sensor means 68 consists of 10 photosensitive transistors 76 each of which is located in the housing on the same radius as a corresponding light emitting diode 72. Thus, only one light emitting diode 72 will be capable of illuminating a mated and axial photosensitive transistor 76. Each collector of the plurality of photosensitive transistors 76 is connected in series through resistor 79, see FIG. 3, to the source of D.C. current available in supply lead 74.

When light is focused on the base of any of the transistors 76, a state of electrical conduction will be present. That is, an electrical signal will be permitted to flow from the collector to the emitter whereas without illumination reaching the base these photosensitive transistors are in the non-conducting state.

The output from each of the photosensitive transistors 76 is directly transmitted into the base of a corresponding series switching transistor 78. Each of the switching transistors 78 will translate the operational electrical signal voltage level from its corresponding photosensitive transistor 76 to supply a digital analyzer 70 with a compatible input signal. An altitude is determined from the input signal for retention in and continually updated in the memory of the transponder 73.

Each of the switching transistors 78, upon receiving the operational signal at its base will allow electrical current to flow from its collector to its emitter to establish an altitude code. This code will be of the binary nature, where one is represented by a conducting transistor and zero is represented by a non-conducting transistor. This code is the output of the altitude digitizer and represents the altitude of the aircraft in digital form in 100 foot increments.

The air traffic control transponder accepts the coded altitude output from the encoding altimeter and when interrogated from a ground station it will transmit the aircraft altitude to the ground station for display on the air traffic controller's radar screen.

A resistor 80 is connected in parallel with each of the switching transistors 78 between the emitter of the photosensitive transistor 76 and a common lead 82 going to the digital analyzer 70. Each of the resistors 80 act as a bleed to insure that the corresponding switching transistor 78 remains in a non-conducting state even though some electric current may leak past the photosensitive transistors 76. This will assure that the deviation of digital information from the code on the disc 60 is not influenced by an outside condition.

During interrogation of the transponder by the air traffic controller for information other than altitude, it is desirable to momentarily prevent digital data from being transmitted thereto since other constant information, such as the aircraft's identity is also needed to be received without interference. To achieve this I have added an inhibitor means 83 to the power supply 74. The inhibitor means 83 is responsive to an interrogation command to prevent electrical current from operating the light emitting diodes 72 and the photosensitive transistors 76 from which the digital signal is derived.

The inhibiting means consists of a first PNP transistor 84 having its emitter connected to the power supply 74, its base connected through resistor 86 to the collector of an NPN transistor 88, and its collector connected back to that portion of the supply line going to the light emitting diodes 72 and the photosensitive transistors 76. The NPN transistor 88 has its base connected through resistor 90 to the power source 74 and through resistor 92 to ground, and its emitter connected to common lead 88 going to the digital analyzer 70 of the transponder 73.

MODE OF OPERATION OF THE PREFERRED EMBODIMENT

When an aircraft equipped with an encoding altimeter 10 as shown in FIG. 1 is airborne and it is desired to report the flying altitude of the aircraft, a control in the transponder is actuated to connect the common lead 89 to ground. Electrical current in the supply line 74 will pass through resistor 90 to the base of NPN transistor 88 to allow current flow from the collector to the emitter to the grounded common lead 89. At the same time, the base in the PNP transistor 84 will be biased into a saturated condition to essentially permit current to flow from the power source to actuate the plurality of light emitting diodes 72, and the photosensitive transistors 76. With changes in elevation, capsule 54 will change physical dimensions to move the segment gear 58 which will rotate shaft 12 and so inform the operator through the position of needle 26 and discs 36 and 44 with respect to the indicia on the first dial 28. This rotation will cause disc 60 to rotate into a position where the opaque and translucent segments will be illuminated by the light emitting diodes 72. As can be seen n FIG. 3, not all the photosensitive transistors 76 will be illuminated. The photosensitive transistors 76 which receive illumination at their base will be driven into a conduction state which will cause electrical energy to flow from the emitters to change the electrical bias on the base on the corresponding switching transistor 78. This bias on the base of the switching transistor 78 will permit electrical current to flow from the emitter into the common lead 89.

The digital analyzer 70 is connected through 10 leads 94, one of which will represent a single integer from 0–9. As the coded pattern on commutator disc 60 changes, different photosensitive transistors 76 will be illuminated. With each change in altitude rotating disc 60, the digital output on leads 94 will correspondingly change to provide an altitude signal for storage in the memory of the transponder 73.

Upon approach to an airport, an air traffic controller will transmit an interrogatory signal to the transponder 73 in the aircraft. If this interrogatory signal requests information other than altitude, the transponder can disconnect common lead 89 from ground at which time the emitter on the NPN transistor 88 will cease to conduct which will force the PNP transistor 84 into a nonconducting state to inhibit the flow of electrical current from source 74 to the light emitting diodes 72 and the photosensitive transistors 76. During this period of electrical current inhibitions, the transponder 73 in the aircraft will transmit the information requested by the interrogatory signal such as aircraft identity. When the interrogatory signal requests altitude information, the common lead 89 will again be connected to ground by the transponder 73 and inhibitor means 83 will again allow electrical current to be supplied to operate the light emitting diodes 72 and photosensitive transistors to produce an up to date digital signal of the altitude of the aircraft for retention in the memory connected to the digital analyzer 70 of the aircraft transponder 73.

I claim:

1. In an altimeter having a disc with opaque and translucent segments interspersed at radii thereon from which a binary signal is created to inform an air traffic ground control receiver of flight parameters, encoder means for converting the opaque and translucent segments into said binary signal, said encoder means comprising:
    light means adjacent a first side of said disc located at various radii for presenting illumination to said opaque and translucent segments from which a code is established to represent a flight parameter;
    sensor means adjacent a second side of said disc on said radii in axial alignment with said light means for converting said code into a series of electrical signals;
    transmitting means including a plurality of switching transistors connected to said sensor means for translating the voltage level of said electrical signals into compatible operational signals to energize a digital analyzer to produce said binary signal; and
    inhibitor means connected to an operational energy source for the light means and sensor means for interrupting the operational signal from the series of switching transistors in response to an input command to permit information stored in an external transponder memory to be presented to said air traffic ground control receiver without interference.

2. In the altimeter, as recited in claim 1, wherein said light means includes:
    a plurality of light emitting diodes, each of which presents illumination at a single radius without being dispersed to adjacent radii to prevent the possibility of said sensor means receiving an erroneous code.

3. In the altimeter, as recited in claim 2, wherein said sensor means includes:
    a plurality of photosensitive transistors mated with said light emitting diodes, each of which upon receiving illumination permitting an electrical current signal to flow to said transmitter means and in the absence of illumination preventing the flow of the electrical current signal.

4. In the altimeter, as recited in Claim 3, wherein said plurality of switching transistors are connected in series with said photosensitive transistors and said digital analyzer for changing the operational signal in a direct relationship with said electrical current signal.

5. In the altimeter, as recited in claim 4, wherein said transmitting means further includes:
    resistor means connected in parallel with the switching means between each of said photosensitive transistors and the digital analyzer for preventing an electrical current signal below a predetermined value from affecting the operational signal.

6. In the altimeter, as recited in claim 5, wherein said plurality of switching transistors, each has its base connected to receive said electrical current signal from a single photosensitive transistor, a collector connected to said digital analyzer, and an emitter connected in a common lead with the other emitters in said series of transistors to the digital analyzer.

7. In an altitude sensor having a disc with opaque and translucent segments interspersed at radii thereon from which a binary signal is created to inform an air traffic ground control receiver of flight parameters, encoder means for converting the opaque and translucent segments into said binary signal, said encoder means comprising:
    transmitter means adjacent a first side of said disc located at various radii for presenting illumination to said opaque and translucent segments from which a code is established to represent a flight parameter;
    receiver means adjacent a second side of said disc on said radii in axial alignment with said transmitter means for converting said code into an electrical signal;
    amplifier means connected to said receiver means for translating the voltage level of said electrical signal into a compatible operational signal to energize a digital analyzer to produce said binary signal; and
    inhibitor means connected to the operational energy source for the transmitter means and receiver means for momentarily interrupting the development of said code from which the operational signal is derived in response to a remote input command from said air traffic ground control receiver to permit information stored in an external transponder memory to be presented to said air traffic ground control receiver without interference.

8. In the altitude sensor, as recited in claim 7, wherein said transmitting means includes:
    a plurality of light emitting diodes, each of which presents illumination at a single radius without being dispersed to adjacent radii to prevent the possibility of said sensor means receiving an erroneous code.

9. In the altitude sensor, as recited in claim 8, wherein said receiver means includes:

a plurality of photosensitive transistors mated with said light emitting diodes, each of which upon receiving illumination permitting an electrical current signal to flow to said amplifier means and in the absence of illumination preventing the flow of the electrical current signal.

10. In the altitude sensor, as recited in claim 9, wherein said amplifier means includes:

switching means connected in series with each of said photosensitive transistors and said digital analyzer for changing the operational signal in a direct relationship with said electrical current signal; and resistor means connected in parallel with the switching means between each of said photosensitive transistors and the digital analyzer for preventing an electrical current signal below a predetermined value from affecting the operational signal.

11. In the altitude sensor, as recited in claim 9, wherein said switching means includes:

a series of transistors, each of which having a base connected to receive said electrical current signal from a single photosensitive transistor, a collector connected to said digital analyzer and an emitter connected in a common lead with the other emitters in said series of transistors to the digital analyzer.

12. In an altitude sensor having a disc with opaque and translucent segments interspersed at radii thereon from which a binary signal is created to inform an air traffic ground control receiver of flight parameters, encoder means for converting the opaque and translucent segments into said binary signal, said encoder means comprising:

transmitter means having a plurality of light emitting diodes adjacent a first side of said disc located at various radii for presenting illumination to said opaque and translucent segments from which a code is established to represent a flight parameter;

receiver means having a plurality of photosensitive transistors adjacent a second side of said disc on said radii in axial alignment with said light emitting diodes for converting said code into an electrical signal;

amplifier means having a switching transistor means connected in series with said receiver means and transmitter means for translating the voltage level of said electrical signal into a compatible operational signal to energize a digital analyzer to produce said binary signal;

resistor means connected in parallel with said switching transistor means between the photosensitive transistors and the digital analyzer to prevent an electrical signal below a predetermined value from affecting said operational signal; and inhibitor means connected to the operational energy source for the transmitter means and receiver means for interrupting the development of said code from which the operational signal is derived in response to an input command to permit information stored in an external transponder memory to be presented to said air traffic ground control receiver without interference.

13. In the altitude sensor, as recited in claim 12, wherein said switching means includes:

a series of transistors, each of which having a base connected to receive said electrical current signal from a single photosensitive transistor, a collector connected to said digital analyzer and an emitter connected in a common lead with the other emitters in said series of transistors to the digital analyzer.

14. In the altitude sensor, as recited in claim 12 wherein each of said plurality of light emitting diodes presents illumination at a single radius without being dispersed to adjacent radii to reduce the possibility of any of said plurality of photosensitive transistors receiving erroneous information which could affect the development of said code.

15. In the altitude sensor, as recited in claim 14, wherein each of said plurality of photosensitive transistors is mated with said light emitting diodes, each of said photosensitive transistors upon receiving illumination permitting an electrical current signal to flow to a single transistor in the switching transistor means and in the absence of illumination preventing the flow of the electrical current signal.

* * * * *